United States Patent [19]
Asbjornsen et al.

[11] Patent Number: 5,447,359
[45] Date of Patent: Sep. 5, 1995

[54] ARRANGEMENT IN A FOOT REST

[75] Inventors: Svein Asbjornsen, Sykkylven; Jan Lade, Straumgierde, both of Norway

[73] Assignee: Mobilitet A/S, Oslo, Norway

[21] Appl. No.: 955,896

[22] PCT Filed: Jun. 25, 1991

[86] PCT No.: PCT/NO91/00092

§ 371 Date: Dec. 10, 1992

§ 102(e) Date: Dec. 10, 1992

[87] PCT Pub. No.: WO92/01409

PCT Pub. Date: Feb. 6, 1992

[30] Foreign Application Priority Data

Jul. 17, 1990 [NO] Norway .................. 903182

[51] Int. Cl.⁶ .............................. A47C 7/50
[52] U.S. Cl. .............. 297/423.35; 297/423.26
[58] Field of Search .......... 297/423, 429, 433–436, 297/423.26, 423.23, 423.3, 423.34, 423.35, 423.19, 423.1

[56] References Cited

U.S. PATENT DOCUMENTS

| | | | |
|---|---|---|---|
| 561,900 | 6/1896 | Levinge | 297/433 |
| 586,432 | 7/1897 | Gower | 297/366 |
| 1,828,470 | 10/1931 | Monnot | 297/433 X |
| 1,872,444 | 8/1932 | Gowie | 297/433 X |
| 2,044,992 | 6/1936 | May | 297/436 X |
| 2,174,622 | 10/1939 | Dale | |
| 2,720,911 | 10/1955 | Lantz | 297/433 X |
| 2,935,123 | 5/1960 | Lloyd-Young | |
| 3,975,051 | 8/1976 | Ballagh | 297/433 X |
| 4,264,103 | 4/1981 | Peresada et al. | 297/436 X |
| 4,678,229 | 7/1987 | Ryan et al. | 297/433 X |
| 4,819,987 | 4/1989 | Stringer | 297/434 |

FOREIGN PATENT DOCUMENTS

| | | | |
|---|---|---|---|
| 654735 | 3/1986 | Switzerland | . |
| 2094621 | 9/1982 | United Kingdom | 297/434 |

Primary Examiner—Peter R. Brown
Assistant Examiner—Milton Nelson, Jr.
Attorney, Agent, or Firm—Darby & Darby

[57] ABSTRACT

A foot rest of a chair includes a seat connected to a frame of the chair. A foot rest is connected to the frame of the chair. The foot rest comprises an inner extendable supporting member to support the rear side of the legs of a user and is pivotably connected to the frame of the chair. The foot rest further comprises an outer supporting member for placing the feet of a user thereon. The supporting members are pivotably linked to each other to permit a stowed position of the supporting members when not being used and an unfolded position when in use, respectively. The two supporting members are pivotably linked to each other by a linking mechanism disposed between the supporting members. The linking mechanism permits the two supporting members to define an angle therebetween from 0° to 180° corresponding to a stowed position and a fully opened position, respectively, such that in the stowed position a support surface of the inner supporting member faces a support surface of the outer supporting member. At least one of the two mutually linked supporting members is pivotably linked to a foldable flap, so as to provide a plurality of sitting positions for the user of the chair by combining the angular mutual position of the supporting members and the foldable flap.

12 Claims, 10 Drawing Sheets

ARRANGEMENT IN A FOOT REST

BACKGROUND OF THE INVENTION

The present invention relates to an arrangement in a foot rest, especially a foot rest associated with a passenger chair, said foot rest comprising in relation to the chair seat an inner supporting member serving to support the rear side of the leg, as well as an outer supporting member for placing the feet thereon, said supporting members being linked together for thereby allowing for a folded position when not being used and an unfolded position when in use, respectively.

PRIOR ART

From U.S. Pat. No. 2,044,992 there is known a customer chair comprising a double set of foot rests, the lower foot rest being used for adult users, whereas the upper foot rest is to be used for children. The foot rest itself comprises a rigid frame depending from the chair seat under a fixed angle, whereas the two foot rests can be pivoted between a substantial vertical position when not in use and a horizontal position for supporting the feet of an adult person or the feet of a child, respectively.

Such a prior art foot rest does not render the possibility of combining the support of a user's legs and feet, let alone the possibility of pivoting the complete foot rest to a substantially horizontal position for thereby constituting an extended lying support for the user of the chair, especially when the back rest of the chair has been reclined to a lying position.

From U.S. Pat. No. 2,174,622 there is known a passenger chair for aircrafts, especially a reclinable chair, comprising a combined leg and foot rest. The leg and foot rest is composed of two sections, namely a leg section and a foot section mutually connected by means of a hinge in such a manner that the foot section can be folded below the leg section, which is impractical in connection with the stowing away or the pulling forth of the combined leg and foot rest. In a special embodiment of the prior art leg and foot rest, the foot rest comprises a bracket which is slidably attached to the foot section and extends along the lower portion of the foot section for constituting a transverse bar onto which the feet or the heels can be rested. Such a slidable heel support further complicates the prior art leg and foot rest, since the adjustment of this heel bar must be effected by means of a complicated locking mechanism. Neither does this prior art leg and foot rest comprise means allowing for the mutually linked supporting members in a folded out user position to take various angular positions in relation to each other, in dependence of the angular position of for example the inner leg supporting member or section.

U.S. Pat. No. 2,935,123 relates to a leg support for an easy chair, said leg support comprising a plurality of regulating mechanisms comprising wing nuts and bolts. This prior art leg support is adapted to be mounted on the front side of an easy chair, and will consequently not be stowed away below the chair seat portion itself.

From U.S. Pat. No. 4,819,987 there is known a leg support for an aircraft seat, said leg support or foot rest comprising an outwardly extending leg supporting member which is pivotably connected to the seat frame, as well as a foot rest which is pivotably connected to the front end of the leg support. However, this prior art foot rest does not give any instructions for the two members to take different angular positions in relation to each other in an unfolded user position, let alone gives any instructions for at least one supporting member being provided with a foldable flap.

From CH 654 735 there is known a foot rest for an aircraft seat, comprising an inner leg supporting member and an outer foot supporting member which can be folded together in relation to each other in a stowed away position. However, neither does this foot rest give any instructions for two different members which are adapted to take different angular positions in relation to each other in an unfolded user position, let alone give instructions for at least one supporting member being provided with a foldable flap.

From FR 1 315 414 there is known a pull out foot rest attached in relation to a chair, the pull out foot rest further comprising a foot rest means which can be pivoted out between two frames carrying a front foot rest. However, this prior art technique does not teach a foot rest constituting a combined leg and foot rest.

SUMMARY OF THE INVENTION

An object of the present invention is to give instructions for a foot rest of the type stated in the preamble, which in relation to the prior art exhibits further advantages as regards giving the user versatile sitting and/or lying comfort especially related to reclinable aircraft seats, but generally related to passenger seats.

A further object of the invention is to give instructions for a foot rest which is especially appropriate in connection with aircraft seats installed in long distance passenger airplanes, in which the passengers have a need for sleeping accommodation during the journey. By mutual displacement of the aircraft seats, a passenger can then be offered more space between the aircraft seats, and thereby bring the foot rest to a position constituting an elongation of the reclined aircraft seat chair, such that this can be used for sleeping accommodation.

A further object of the invention is to provide a foot rest which also in a more or less upright position of the chair offers increased comfort and variations as regards sitting positions during the journey.

According to the invention these objects are achieved in an arrangement in a foot rest of the type stated in the preamble, which is characterized in that at least one of the supporting members is provided with a foldable flap. It is to be understood that the foldable flap constitutes a portion of the respective supporting member.

Appropriately, the foldable flap on the leg supporting member is constituted by an inner portion which is larger than half of the total surface of the leg supporting member, the foldable flap of the foot supporting member constituting a portion which is larger than half of the total surface of the foot rest member and is pivotably arranged at an edge portion closer to the free edge of the foot supporting member.

Further features and advantages of the present invention will appear from the following description, reference being had to the attached drawings.

DETAILED DISCLOSURE OF EMBODIMENTS

Figure 1:
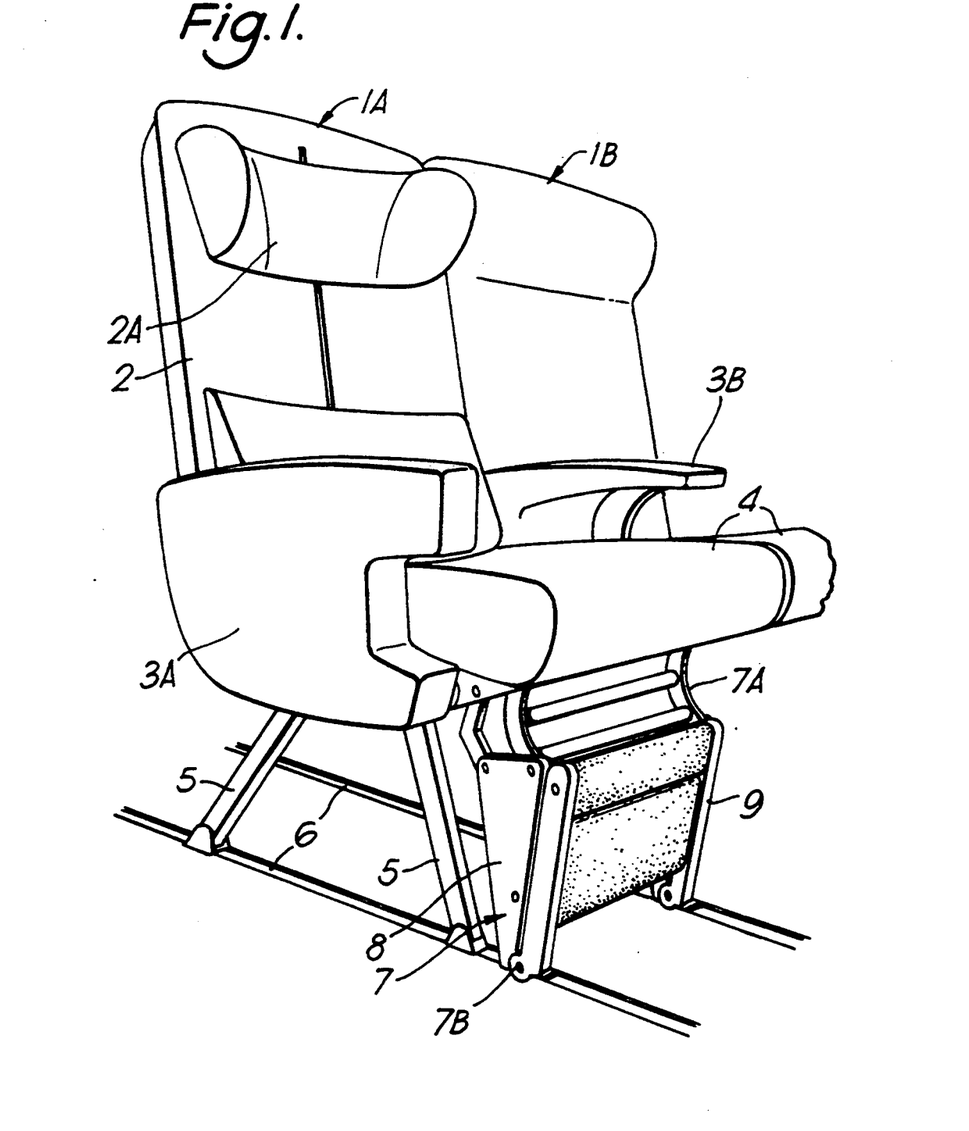
FIG. 1 illustrates perspectively an embodiment of an arrangement in a foot rest according to the present invention, especially a foot rest being associated with a passenger chair, said foot rest here being illustrated in a folded position out of use.

In FIG. 1 there is illustrated a first embodiment of a foot rest according to the present invention, especially a foot rest being associated with a passenger chair 1A or 1B, for example a passenger chair in an aircraft or any appropriate transportation vessel or vehicle. Such a passenger chair 1A may comprise a back rest 2 including a neck rest 2A, the back rest 2 being adapted to take various angular positions depending on whether the passenger wants to sit in an upright position or in a reclined approximately lying position. Further, the chair 1A or 1B comprises arm rests 3A, 3B and a seat 4 as well as chair legs 5 which are arranged on rails 6, it being understood that the legs 5 are detachably affixed to the rails 6 for possibly displacing the chair 1A, such that the spacing between the aircraft chairs may be altered for thereby offering a better passenger space. According to the invention there is on the chair 1A mounted a foot rest which is here generally designated by reference numeral 7, and which is attached to the chair seat frame or a stationary member of the chair by means of an appropriate mechanism 7A. The foot rest 7 of this embodiment comprises an inner supporting member 8 serving for supporting the rear side of the legs, as well as an outer supporting member 9 onto which the feet can be placed, which supporting members 8 and 9 are linked together by means of appropriate links or mechanisms 7B for thereby taking the folded together position as illustrated in FIG. 1. This folded together position which is illustrated in FIG. 1, constitutes a position in which the foot rest is out of use, whereas the position illustrated in FIG. 2 constitutes a first folded out user position of the foot supporting member 7, wherein a user 10 then can put his feet 12 on said foot supporting member 9.

Figure 3:
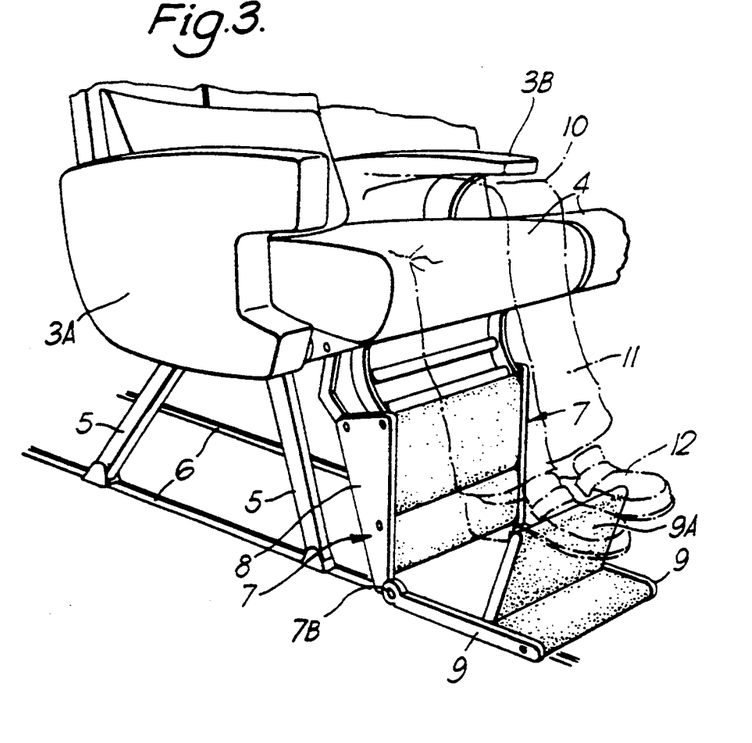
FIG. 3 illustrates the same position of the foot rest as in FIG. 2, but with the flap of the foot supporting member in a folded out position.

What is special in the foot rest according to the invention, is that the foot supporting member 9 is provided with a foldable flap 9A, as this appears from FIG. 3, and when the foldable flap 9A is in the illustrated folded out position, a user 10 may position his feet 12 on the upper edge of the flap 9A of the foot supporting member 9.

Figure 2:
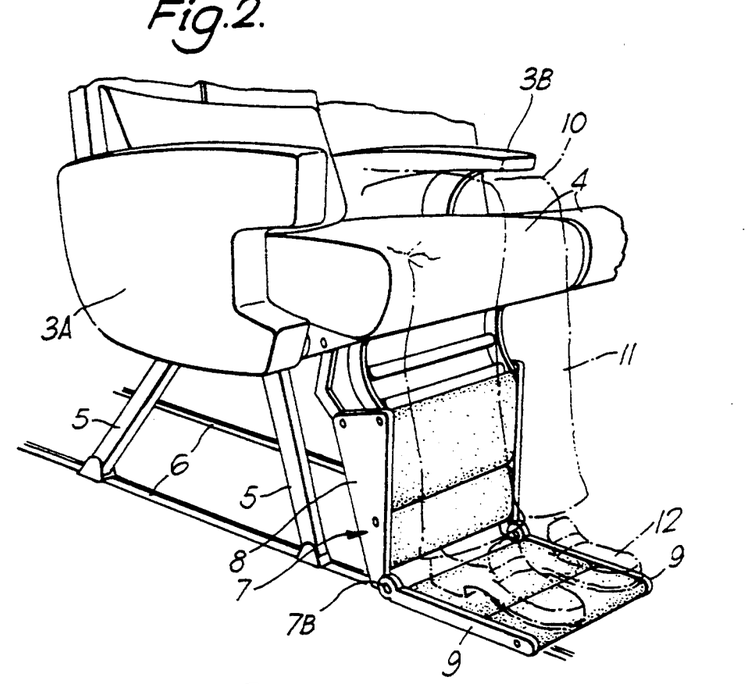
FIG. 2 illustrates the foot rest in a first user position in which the linked foot supporting member rests on or just above the floor surface.
Figure 4:
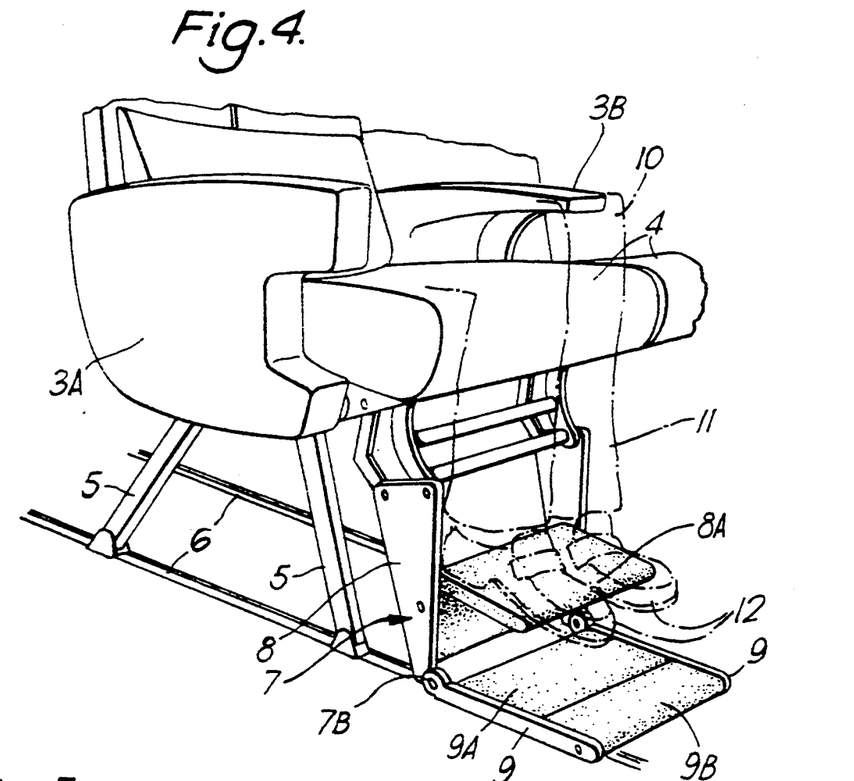
FIG. 4 illustrates the foot rest according to FIGS. 2 and 3 with the flap of the foot supporting member in folded in position, but with the flap of the leg supporting member in folded out position.

In this first "main" position of the foot rest 7 according to the invention, as this appears from FIGS. 2 and 3, the user 10 will also have the possibility of folding out a flap 8A of the leg supporting member 8, as this appears from FIG. 4. In the latter Figure, the user 10 may then position his feet 12 on the main surface of the flap 8A, whereas the flap 9A of the foot supporting member 9 may then appropriately be in its folded in position.

As appearing from FIGS. 2, 3 and 4 the foldable flaps 8A and 9A, respectively, constitute an inner portion of the respective leg and foot supporting member 8 and 9. In a special embodiment the foldable flap 8A of the leg supporting member 8 may be constituted by an inner portion which is larger than half of the total surface of the leg supporting member 8, the foldable flap 9A of the foot supporting member 9 constituting a portion which is larger than half of the total surface of the foot supporting member 9, and is pivotably arranged at an edge portion closer to the free end edges 9B of the foot supporting member 9. It should also be understood that the foldable flap 8A of the leg supporting member 8 is also pivotably arranged, such that the user 10 by for example a simple movement of the foot can bring the flap to its folded out or folded in position.

In the position of the foot rest 7 illustrated in FIGS. 2, 3 and 4, the foot supporting member 9 and the foot supporting member 8 have an angle in relation to each other of approximately 90°, but it is to be understood that this angle can be changed, such that the two said parts may take various angular positions in relation to each other in the folded out user position of the foot rest 7 itself, for example independent of the angular position of the inner leg supporting member 8.

In the position illustrated in FIGS. 2, 3 and 4, the inner leg supporting member 8 extends downwardly from the seat 4 of the chair making a relatively little angle in relation to a vertical plane, and in this position the linked foot supporting member 9 is illustrated to rest on or just above the floor surface, but it is to be understood that the angle between said two supporting members and the height of the foot supporting member 9 above the floor, respectively, can be varied within wide limits.

In FIGS. 5, 6, 7, 8, 9 and 10 the first embodiment of the foot rest 7 according to the present invention, is illustrated in a second position, namely in a position in which the inner leg supporting member 8 makes an angle of approximately 20°–40° in relation to a vertical plane, said linked foot supporting member 9 in its folded out user position taking an extended slanted position having substantially the same slope as the leg supporting member 8.

Figure 5:
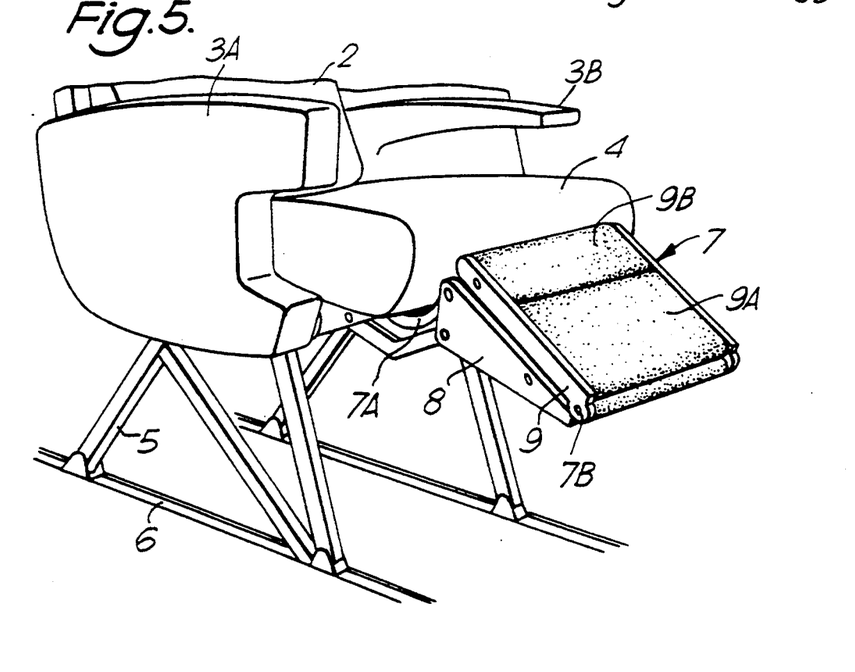
FIG. 5 illustrates the foot rest according to the invention in a second inclined folded together position in relation to a vertical plane.

In this second "main" position of the foot rest 7, FIG. 5 illustrates the foot rest 7 in a folded together position.

Figure 6:
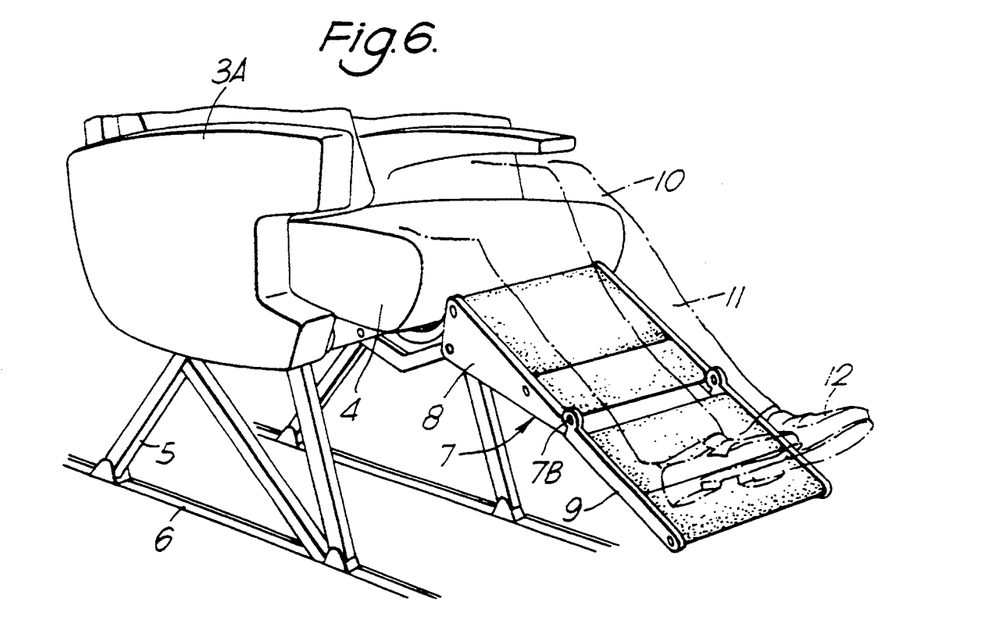
FIG. 6 illustrates the foot rest in the same position as in FIG. 5, but with the foot supporting member in a folded out position.

In FIG. 6 no flaps have been folded out, and the user 10 can then utilize an extended sitting/lying position of the chair seat portion 4, giving full support below the rear side of the legs 11.

Figure 7:
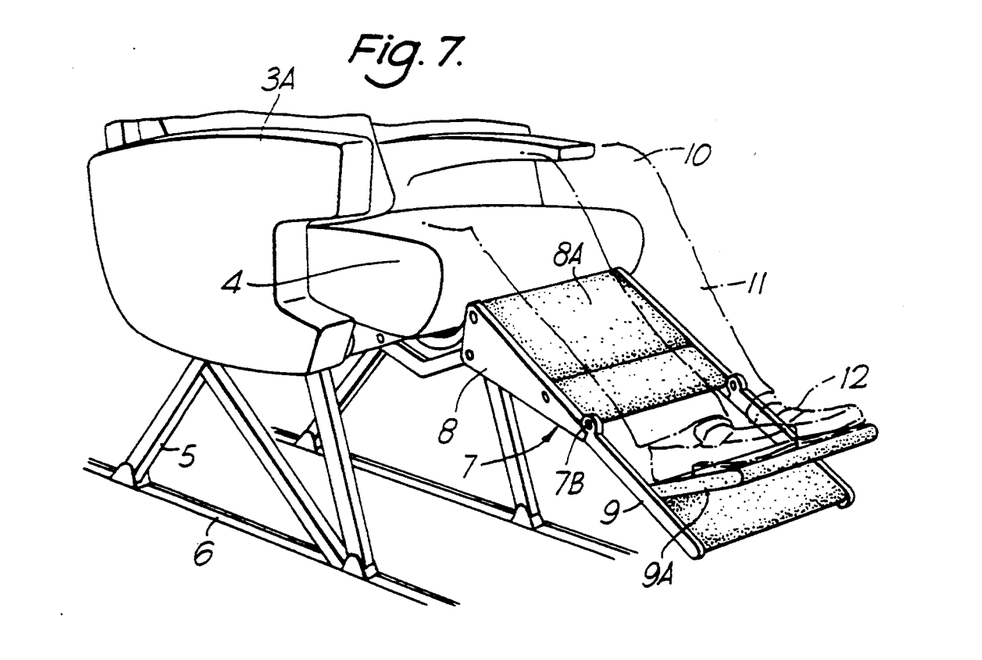
FIG. 7 illustrates the foot rest in the same position as in FIG. 6, but here with the flap of the foot supporting member in folded out position.

In FIG. 7 wherein the flap 9A of the foot supporting member 9 is folded out, the user 10 will have an extended sitting/ lying position similarly to what has been illustrated in FIG. 6, but with an ending support for the feet 12, namely by means of said flap 9A.

Figure 8:
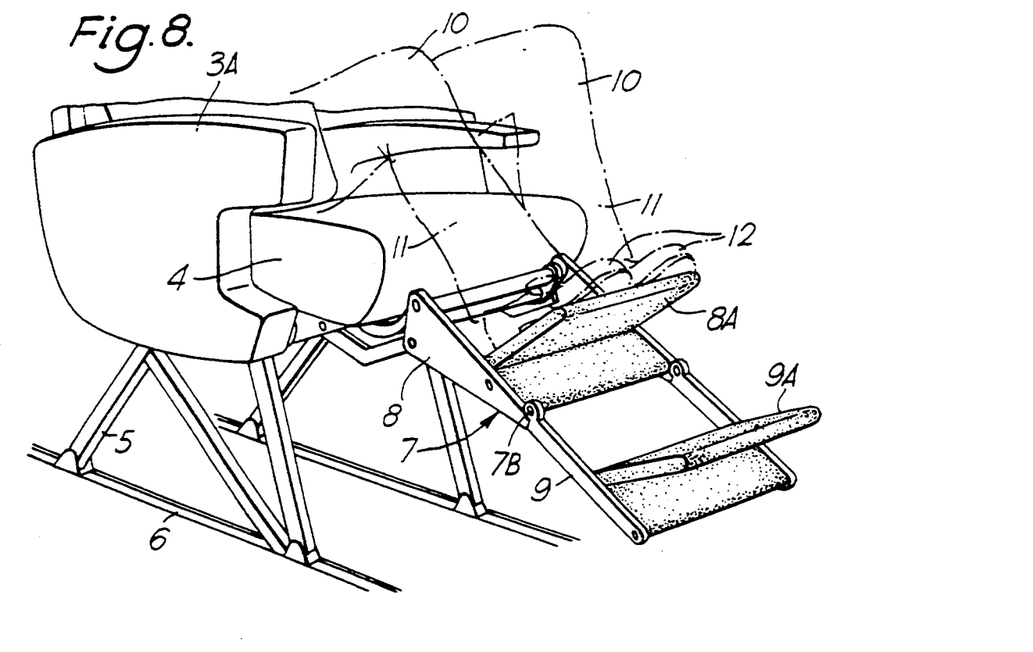
FIG. 8 illustrates the same position of the foot rest, but here with also the flap of the leg supporting member in a folded out position.
Figure 9:
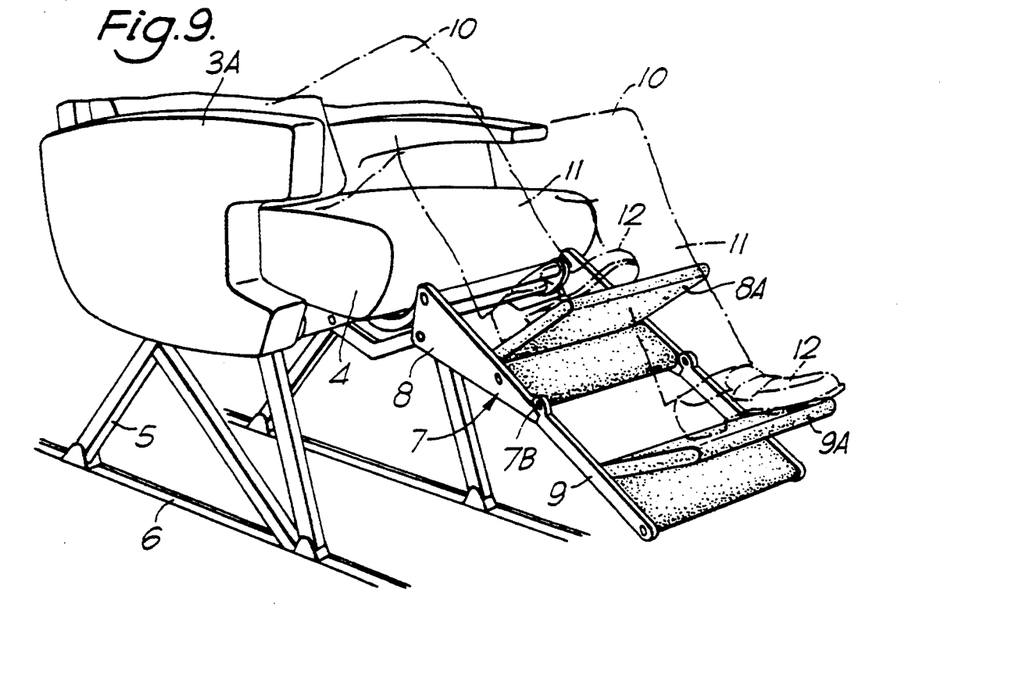
FIG. 9 illustrates the same position as FIG. 8, and the two flaps of the leg supporting member and the foot supporting member, respectively, in folded out position, and illustrates the various user positions to be taken by the user.

In FIGS. 8 and 9 wherein both the leg supporting member 8 and the foot supporting member 9 have its flap 8A and 9A, respectively, folded out, the user 10 can take a varying sitting/lying position whilst alternating placing both feet 12 on the upper leg supporting flap 8A, as this is illustrated in FIG. 8, or positioning one foot 12 on the upper leg supporting flap 8A and the second foot 12 on the lower foot supporting flap 9A.

Figure 10:
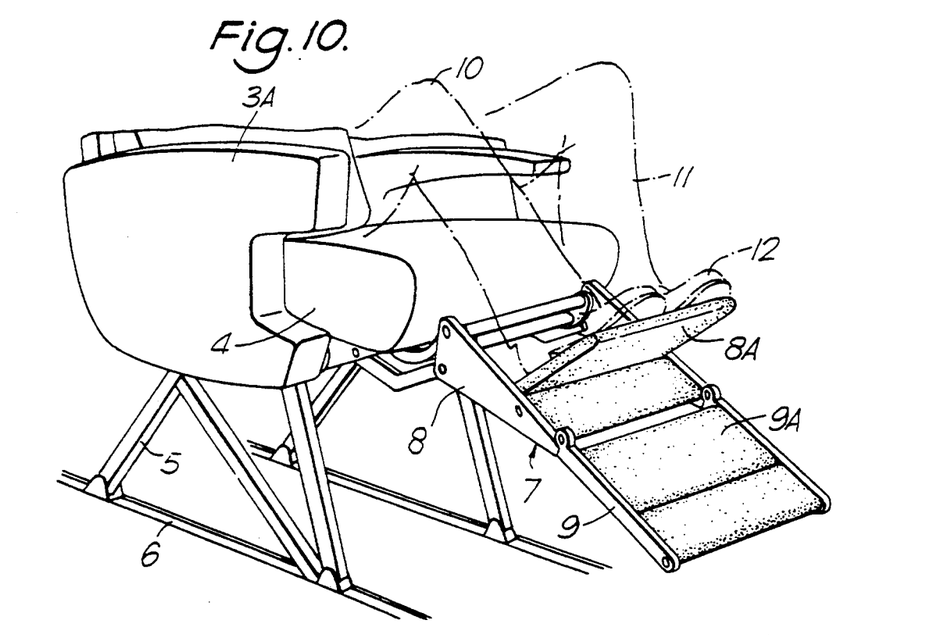
FIG. 10 illustrates a further user variant of the foot rest the second position, only the flap of the leg supporting member here being in a folded out position.

FIG. 10 illustrates the same sitting position as FIG. 8, but here with the lower foot supporting member flap 9A in its folded in position.

In FIGS. 11, 12, 13 and 14 the inner leg supporting member 8 takes a third approximately horizontal "main" position, said linked foot supporting member 9 in its folded out user position taking an extended substantial horizontal position with substantially the same direction of extension as the leg supporting member 8.

Figure 11:
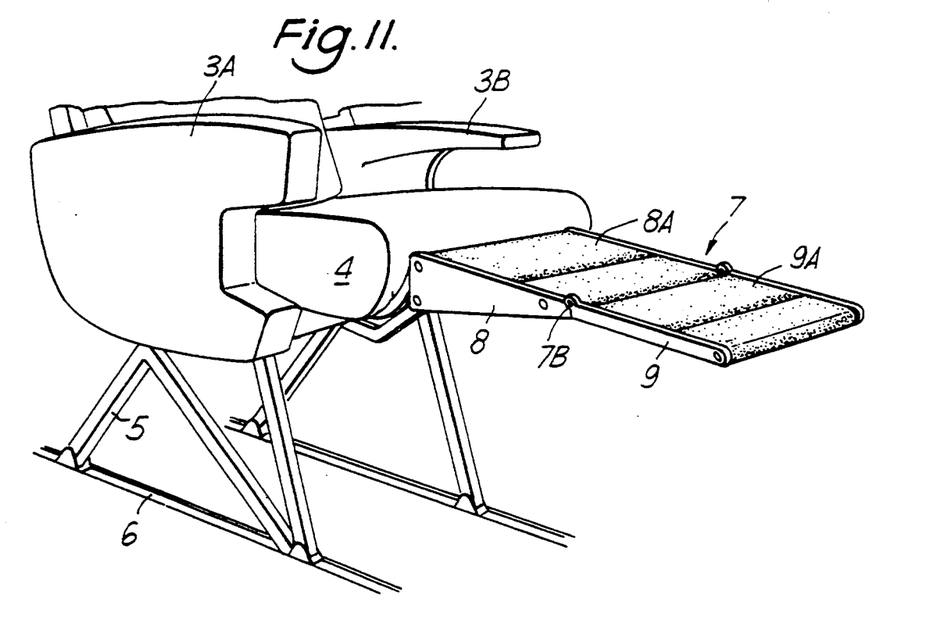
FIG. 11 illustrates the foot rest in a folded out position in a third approximately horizontal position.

In FIG. 11 neither the leg supporting member flap 8A or the foot supporting member flap 9A is folded out, and the chair will then provide a prolonged sitting/lying position in relation to the seat portion 4, giving complete and elevated support underneath the rear side of the user's legs.

Figure 12:
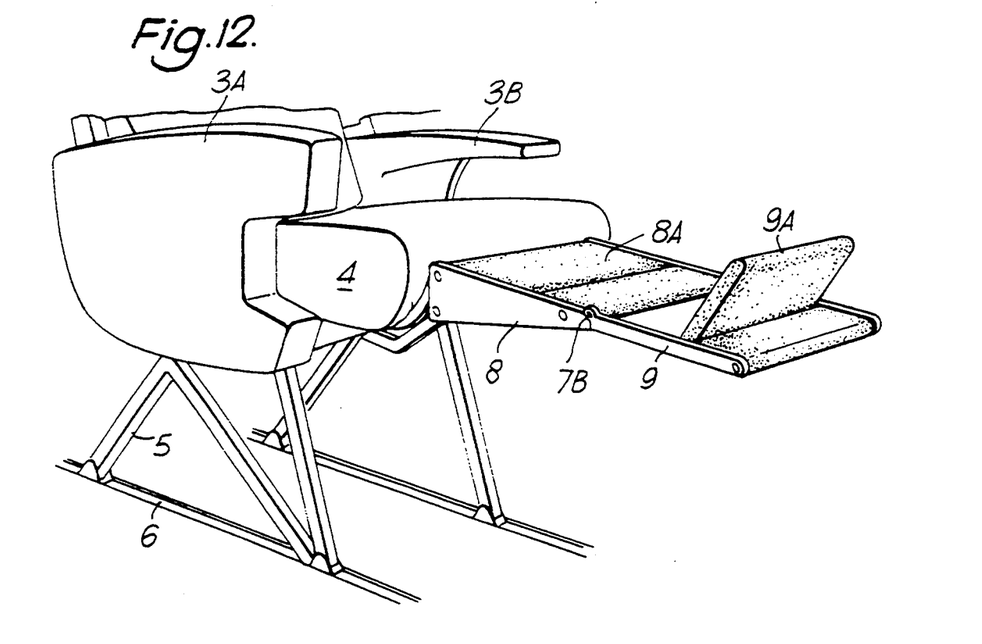
FIG. 12 illustrates the same position of the foot rest as in FIG. 11, but with the flap of the foot supporting member folded out.

When the foot supporting member flap 9A is folded out, as this is illustrated in FIG. 12, the chair will render a prolonged sitting/lying position as illustrated in FIG. 11, but the user will then have a more apparent finished support for his feet.

Figure 13:
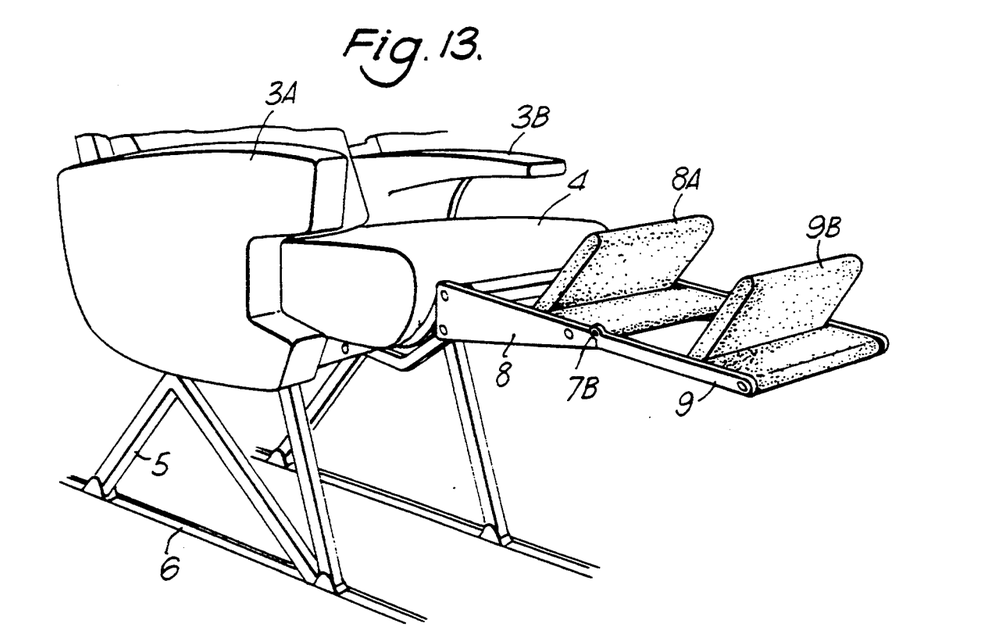
FIG. 13 illustrates the same position of the foot rest as in FIGS 11 and 12, but with the flap of both the leg supporting member and the foot supporting member folded out.
Figure 14:
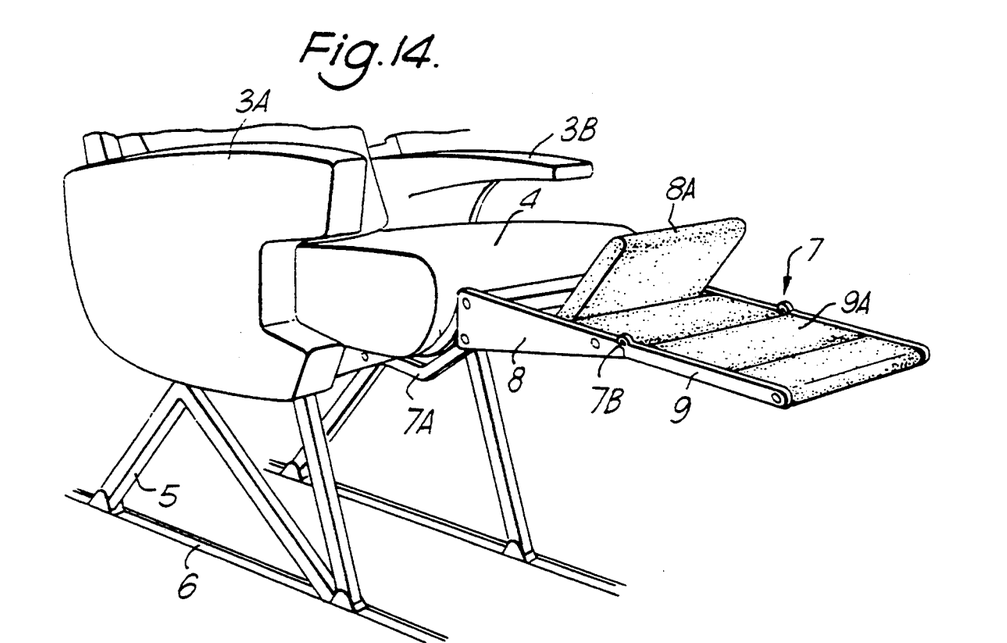
FIG. 14 illustrates a position of the foot rest similarly as in FIGS. 11, 12 and 13, but here with only the flap of the leg supporting member folded out.

FIG. 13 illustrates the flap 8A of the leg supporting member 8 and the flap 9A of the foot supporting member 9 in folded out position, which offers to the user a varying sitting/lying position whilst alternating having both feet on the upper leg supporting flap 8A or one foot on the upper leg supporting flap 8A and the second foot on the lower foot supporting member flap 9A. FIG. 14 illustrates a variant wherein only the flap 8A of the leg supporting member is folded out.

It is to be understood that the three disclosed "main" positions of the foot rest according to the present invention are only meant as examples. The foot rest can of course take any angular position which may be appropriate, and the mutual angle between the foot supporting member 8 and the leg supporting member 9 in the various user positions can be varied within wide ranges.

Further, it is to be understood that various mechanisms may be used for bringing the foot rest to the various disclosed angular positions, for example by appropriate gas springs cooperating with the mechanism 7A connecting the foot rest 7 to the chair frame or seat 4. Further, it is to be understood that the foot rest can be manufactured for simple remounting, which is favourable in a rearrangement between short distance and long distance aeroplanes, or other appropriate transportation means.

Figure 15:
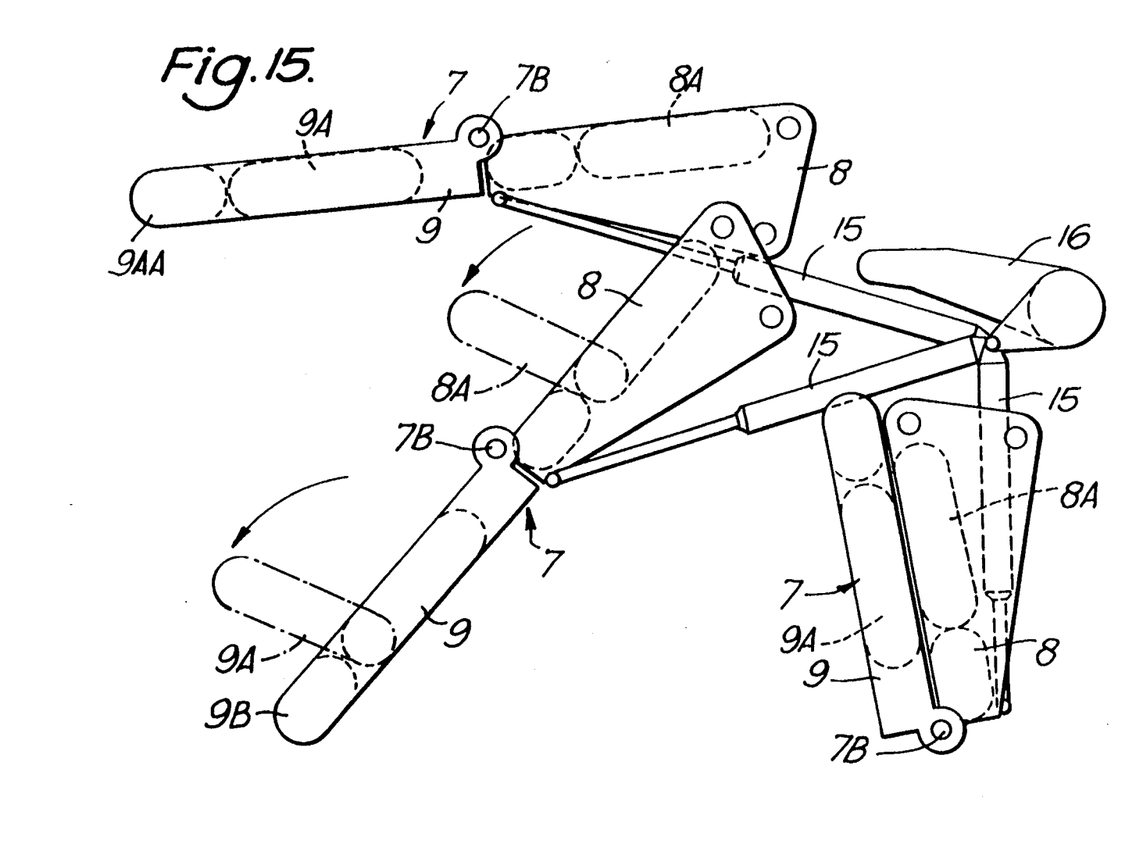
FIG. 15 is a diagrammatic side view of an embodiment of a foot rest according to the invention, illustrated in its first position, the second intermediate position and in the third upper position, respectively.

In FIG. 15 there is disclosed a side view of an appropriate embodiment of a foot rest 7 according to the present invention, three different positions being depicted on the same Figure, corresponding to the previous three examples of "main" positions.

Here is also illustrated a telescope arm 15 which at its inner end is attached to a bracket 16 which is affixed to the base of the chair. The telescope arm 15 can by influencing a gas spring and in cooperation with the previously discussed mechanism 7A, for example by control from the user seat, be brought to an appropriate user position, whereafter the user can adjust these positions within wide limits.

Figure 16:
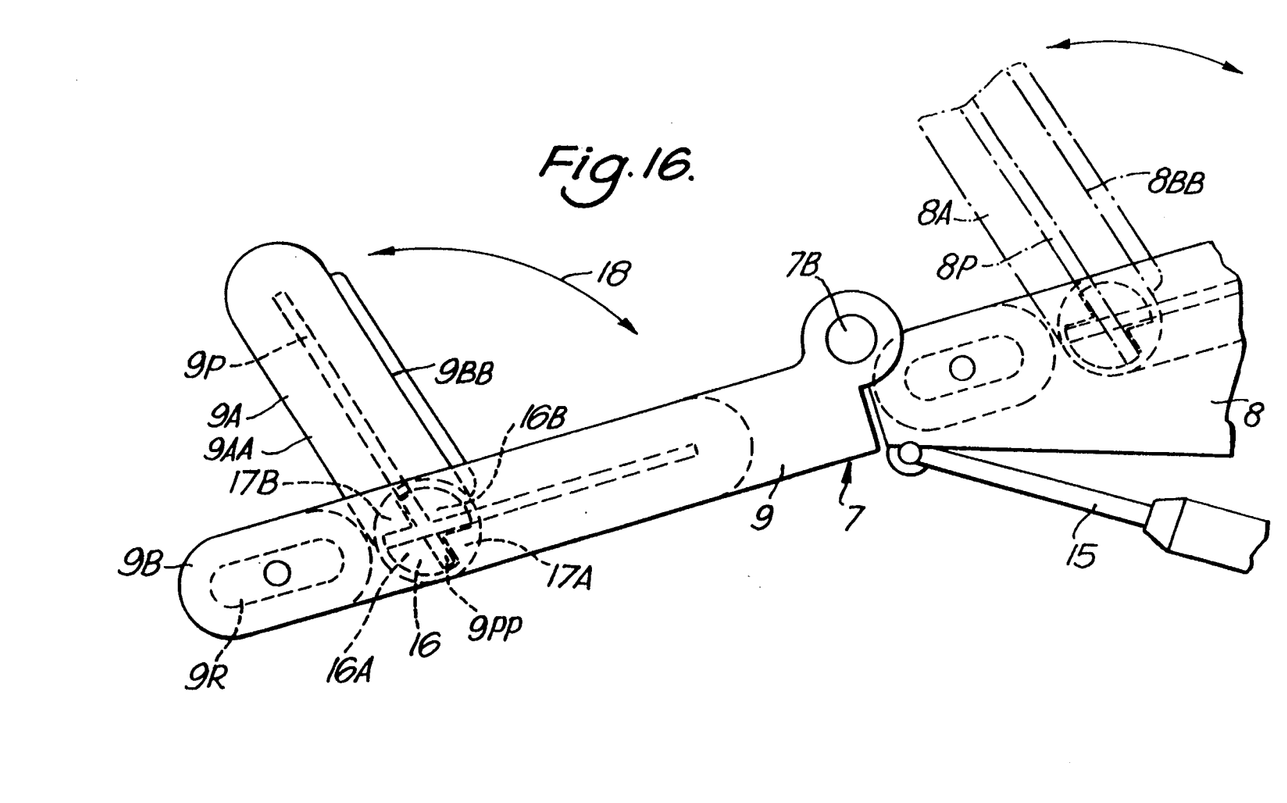
FIG. 16 is a diagrammatic side view of mainly the foot supporting member, and illustrates especially details of the associated foldable flap.

In FIG. 16 there is on a larger scale illustrated details of the flap 9A of the foot supporting member 9, the flap 9A at its one surface 9AA being upholstered, whereas on its second surface 9BB being provided with a resistant layer onto which the user's shoes can be placed.

The same requirements may be attended to in the structure of the leg supporting flap 8A. Both flaps may appropriately be supported such that they manually or by means of a foot can be swung out from and to the folded in position, respectively, which involves that the present foot rest can be manufactured with relatively simple and sturdy parts.

In FIG. 16 it is illustrated that each of the flaps 9A and 9B have been constructed around an inner plate, for example a metal plate or some other strong material 9B and 8B, respectively, said metal plate being inserted between the side elements of the foot and leg supporting member 9 and 8, respectively, for thereby being mounted on the inside of the side elements in appropriate recesses therein. These recesses 16 can be shaped as opposite circle sectors 16A, 16B which allow for a pivotable movement of the inner portions 9PP of the metal plate, namely between sector-shaped abutments 17A and 17B in said side elements, thereby rendering a symmetrical double support in the two different positions of the flaps 9A and 8A. The angle 18 through which the flaps can swing from their folded in position to their folded out position, can be for example approximately 100°, but this angle can of course vary within wide ranges. The end portion 9B of the foot supporting member 9 can be reinforced internally by means of a pipe-shaped body 9R which on the outside is covered by foam or similar, and an appropriate moulding.

We claim:

1. An arrangement in a foot rest of a chair comprising: a seat connected to a frame of said chair, a foot rest connected to the frame of said chair, said foot rest comprising an inner extendable supporting member to support the rear side of the legs of a user and being pivotably connected to the frame of the chair, said foot rest further comprising an outer supporting member for placing the feet of a user thereon, said supporting members being pivotably linked to each other to permit a stowed position of said supporting members when not being used and an unfolded position when in use, respectively, wherein said two supporting members are pivotably linked to each other by a linking mechanism disposed between said supporting members, said linking mechanism permits said two supporting members to define an angle therebetween from 0° to 180° corresponding to a stowed position and a fully opened position, respectively, such that in the stowed position a support surface of said inner supporting member faces a support surface of said outer supporting member, and that at least one of the two mutually linked supporting members being pivotably linked to a foldable flap, so as to provide a plurality of sitting positions for the user of the chair by combining the angular mutual position of said supporting members and the foldable flap.

2. The arrangement as claimed in claim 1, wherein the foldable flap of one of the mutually linked supporting members is constituted by a portion of the one of the mutually linked supporting members.

3. The arrangement as claimed in claim 1, wherein each of the inner supporting member and the outer supporting member is pivotably linked to a foldable flap, the foldable flap of the inner supporting member comprises an inner portion which is larger than half of the total surface of the inner supporting member, and wherein the foldable flap of the outer supporting member comprises a portion which is larger than half of the total surface of the outer supporting member.

4. The arrangement as claimed in claim 1, wherein the foot rest is detachably connected to the seat, means for controlling the angular positions of the foot rest, said controlling means including a gas spring.

5. The arrangement as claimed in claim 1 wherein the inner supporting member includes a foldable flap and the outer supporting member includes a foldable flap, said foldable flaps having an upholstered surface on that surface which is facing forwardly in a folded in position and the upholstered surface is flush with a main surface of the supporting members, whereas said flaps on a second opposite surface facing towards the chair seat in a folded out position are covered by a resistive layer.

6. The arrangement as claimed in claim 1, further comprising a second mechanism to pivotably connect the inner supporting member to the frame to permit the inner supporting member to adjust to various angular positions with respect to the frame.

7. The arrangement as claimed in claim 6, wherein the inner supporting member in a third position is disposed at an approximately horizontal position, said outer supporting member being disposed in a folded out position and having substantially the same approximately horizontal slope as said inner supporting member.

8. The arrangement as claimed in claim 6, wherein the inner supporting member in a second, inclined position is disposed at an angle of approximately 20°-40° with respect to a vertical plane, said outer supporting member being disposed in a folded out position and having substantially the same slope as the inner supporting member.

9. The arrangement as claimed in claim 8, wherein each of the inner supporting member and the outer supporting member is pivotably linked to a foldable flap, the inner supporting member and the outer supporting member render the following sitting positions for the user legs:
 a) the foldable flaps being disposed in a position such that the foldable flaps have substantially the same slope as the inner supporting member such that the supporting members render full support below the rear side of the legs;
 b) the outer supporting member including the foldable flap being disposed in a folded out position such that the extended sitting position of the supporting members rendering support below the rear side of the legs terminating with the foldable flap providing support for the feet; and
 c) both of the supporting members including the foldable flap being disposed in a folded out position such that the sitting position includes both feet being supported on the inner supporting member flap or one foot being supported on the inner supporting member flap and the second foot being supported on the outer supporting member flap.

10. The arrangement as claimed in claim 6, wherein the inner supporting member being angularly adjustable to a first position which extends downwardly from the seat portion of the chair at a relatively small angle with respect to a vertical plane and in this downwardly extending position the outer supporting member being angularly adjustable to a folded out user position where the outer supporting member rests on or just above a floor surface.

11. The arrangement as claimed in claim 5, wherein the folded out outer supporting member includes the foldable flap to support the foot of the user, substantially at a folded out edge portion of the foldable flap.

12. The arrangement as claimed in claim 10, wherein when the folded out outer supporting member rests on or just above the floor, said inner supporting member includes the foldable flap to support the foot of the user at a predetermined distance from the floor.

* * * * *